United States Patent
Scruggs et al.

(10) Patent No.: US 6,986,611 B1
(45) Date of Patent: Jan. 17, 2006

(54) INTEGRATED BI-DIRECTIONAL OPTICAL TRANSCEIVER

(76) Inventors: Jerry Scruggs, 6330 E. Grandview St., Mesa, AZ (US) 85205-4850; Jay Hoge, 7 Plum Tree Rd., Rancho Palos Verdes, CA (US) 90275

( * ) Notice: Subject to any disclaimer, the term of this patent is extended or adjusted under 35 U.S.C. 154(b) by 0 days.

(21) Appl. No.: 10/668,403

(22) Filed: Sep. 23, 2003

Related U.S. Application Data

(60) Provisional application No. 60/412,497, filed on Sep. 23, 2002.

(51) Int. Cl.
 *G02B 6/00* (2006.01)
 *G02B 6/36* (2006.01)

(52) U.S. Cl. ........................................ 385/92; 385/147
(58) Field of Classification Search .................. 385/39, 385/41, 88–92, 133–137, 31–33, 49; 356/301
See application file for complete search history.

(56) References Cited

U.S. PATENT DOCUMENTS

| | | | |
|---|---|---|---|
| 5,487,124 A * | 1/1996 | Bowen et al. | 385/93 |
| 6,389,202 B1 * | 5/2002 | Delpiano et al. | 385/49 |
| 2003/0053048 A1 * | 3/2003 | Bennett et al. | 356/301 |
| 2003/0161603 A1 * | 8/2003 | Nadeau et al. | 385/137 |
| 2004/0202428 A1 * | 10/2004 | Hwang et al. | 385/49 |

\* cited by examiner

*Primary Examiner*—Akm Enayet Ullah
(74) *Attorney, Agent, or Firm*—Parsons & Goltry; Michael W. Goltry; Robert A. Parsons

(57) ABSTRACT

An integrated bi-directional optical transceiver is disclosed, which includes a package that incorporates a header. An optical fiber extends into the package, and is secured thereby adjacent the header. A chip-level optical transceiver is supported by a bench carried by the header in a tilted state aligning the chip-level optical transceiver components with the optical fiber.

17 Claims, 2 Drawing Sheets

INTEGRATED BI-DIRECTIONAL OPTICAL TRANSCEIVER

CROSS-REFERENCE TO RELATED APPLICATIONS

This application claims the benefit of U.S. Provisional Application Ser. No. 60/412,497, filed Sep. 23, 2002.

FIELD OF THE INVENTION

This invention relates to optical transceivers and, more particularly, to packaged optical transceivers.

BACKGROUND OF THE INVENTION

Optical fibers are useful in high-speed data transmission systems. These high-speed systems can include an optical fiber optically coupled to a module which includes a light emitting or light detecting device. A module with a light emitting device is typically referred to as a transmitter module wherein an electrical signal is converted to a light signal which is emitted by the light emitting device and is incident to the optical fiber. A module with a light detecting device is typically referred to as a receiver module wherein an optical signal is converted to an electrical signal.

It is important to minimize the cost of the components included in fiber optic systems. In the prior art, the high cost of transceivers built with existing technology makes it cost prohibitive to undertake installation of extensive fiber networks with individual connections. Thus, it is highly desirable to provide a cost effective optical package which is capable of transmitting and receiving data in a fiber to a home network.

SUMMARY OF THE INVENTION

The above problems and others are at least partially solved and the above purposes and others realized in a preferred apparatus embodiment consisting of an optical fiber, and a chip-level optical transceiver carried by a bench disposed in a tilted state aligning the chip-level optical transceiver with the optical fiber. Further to this embodiment is a package securing and containing the optical fiber, the bench, and the chip-level optical transceiver carried by the bench. The package includes a support structure securing the fiber, and a header coupled to the support structure, in which the bench is carried by the header in front of the optical fiber. Preferably, the bench and the chip-level optical transceiver carried thereby are hermetically sealed by the package. The chip-level optical transceiver consists of a light emitting device, having an output, for emitting a first wavelength of light along a first optical path, a first photodiode for controlling the output of the light emitting device, a second photodiode having an active region, a lens for receiving the first wavelength of light along the first optical path from the light emitting device and collimating the first wavelength of light to the second photodiode along the first optical path, and the second photodiode for reflecting the first wavelength of light along the first optical path into the optical fiber along a second optical path. The optical fiber is capable of transmitting a second wavelength of light to the second photodiode along the second optical path, and the second photodiode adapted and arranged to permit the second wavelength of light to pass therethrough to the active region thereof for conversion into an electrical signal. The first optical path is coincident to the second optical path, and the first wavelength of light is different from the second wavelength of light.

In accordance with the principle of the invention, another apparatus embodiment consists of an optical fiber, a header mounted adjacent the optical fiber, and a chip-level optical transceiver supported by a bench carried by the header in a tilted state aligning the chip-level optical transceiver components with the optical fiber. A support structure secures the fiber, and the header is coupled to the support structure. The support structure and the header cooperate to hermetically seal the bench and the chip-level optical transceiver carried thereby. The chip-level optical transceiver consists of a light emitting device, having an output, for emitting a first wavelength of light along a first optical path, a first photodiode for controlling the output of the light emitting device, a second photodiode having an active region, a lens for receiving the first wavelength of light along the first optical path from the light emitting device and collimating the first wavelength of light to the second photodiode along the first optical path, and the second photodiode for reflecting the first wavelength of light along the first optical path into the optical fiber along a second optical path. The optical fiber is capable of transmitting a second wavelength of light to the second photodiode along the second optical path, and the second photodiode adapted and arranged to permit the second wavelength of light to pass therethrough to the active region thereof for conversion into an electrical signal. The first optical path is coincident to the second optical path, and the first wavelength of light is different from the second wavelength of light.

In accordance with the principle of the invention, still a further apparatus embodiment consists of a package including a header, an optical fiber extending into the package and secured thereby adjacent the header, and a chip-level optical transceiver supported by a bench carried by the header in a tilted state aligning the chip-level optical transceiver components with the optical fiber. The package hermetically seals the bench and the chip-level optical transceiver carried thereby. The chip-level optical transceiver consists of a light emitting device, having an output, for emitting a first wavelength of light along a first optical path, a first photodiode for controlling the output of the light emitting device, a second photodiode having an active region, a lens for receiving the first wavelength of light along the first optical path from the light emitting device and collimating the first wavelength of light to the second photodiode along the first optical path, and the second photodiode for reflecting the first wavelength of light along the first optical path into the optical fiber along a second optical path. The optical fiber is capable of transmitting a second wavelength of light to the second photodiode along the second optical path, and the second photodiode adapted and arranged to permit the second wavelength of light to pass therethrough to the active region thereof for conversion into an electrical signal. The first optical path is coincident to the second optical path, and the first wavelength of light is different from the second wavelength of light.

In accordance with the foregoing summary of preferred embodiments, and the ensuing specification, which are intended to be taken together, the invention also contemplates associated apparatus and method embodiments.

BRIEF DESCRIPTION OF THE DRAWINGS

Referring to the drawings.

DETAILED DESCRIPTION OF THE PREFERRED EMBODIMENT

An integrated bi-directional optical transceiver that is capable of transmitting and receiving data in an optical fiber is disclosed, which includes a package that incorporates a header. An optical fiber extends into the package, and is secured thereby adjacent the header. A chip-level optical transceiver is supported by a bench carried by the header in a tilted state aligning the chip-level optical transceiver components with the optical fiber.

Figure 1:
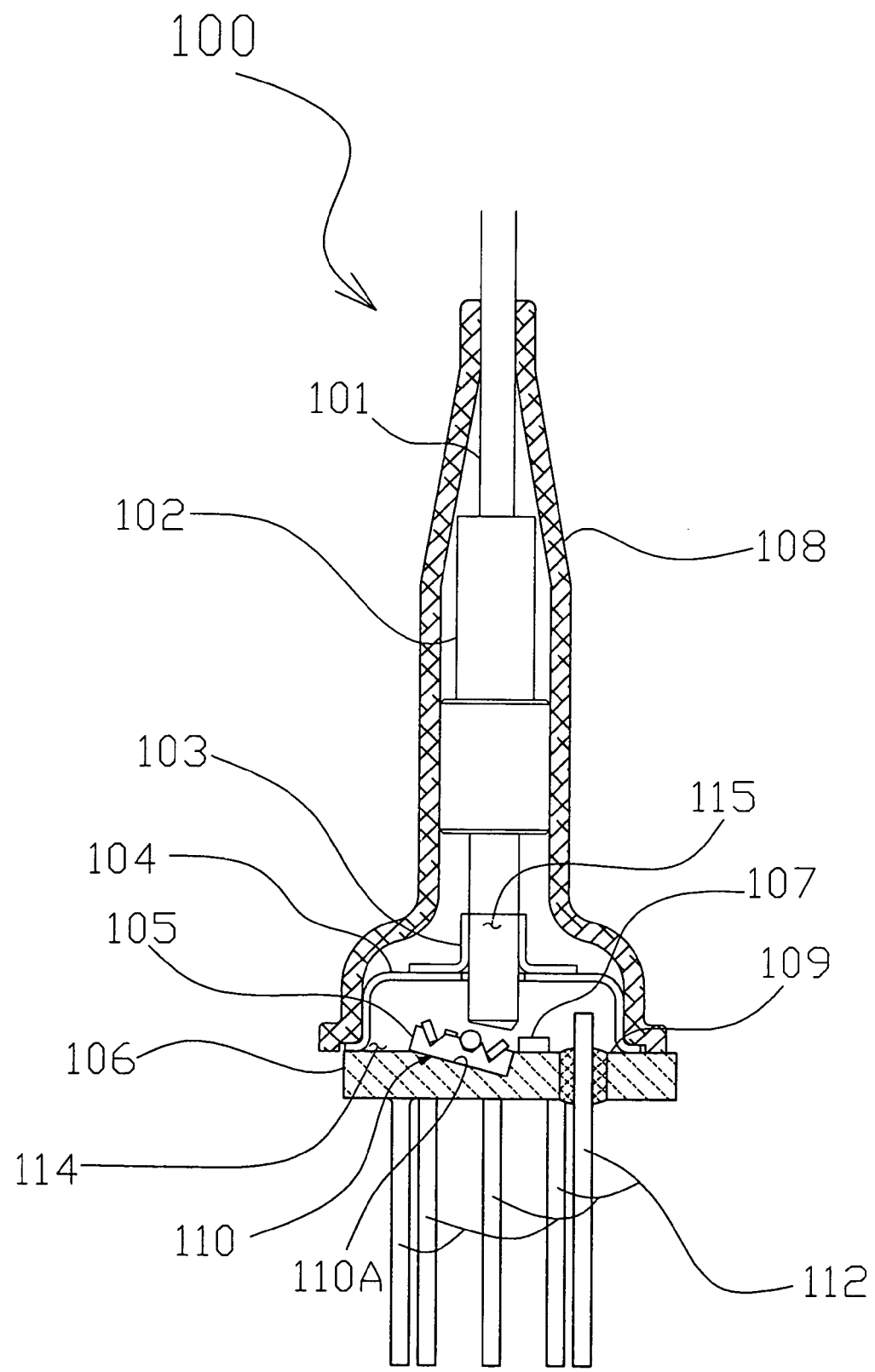
FIG. 1 is a simplified, vertical sectional view of an integrated transceiver package incorporating a tilted bench assembly supporting chip-level optical transceiver components, in accordance with the principle of the invention.

Turning now to the drawings, in which like reference characters indicate corresponding elements throughout the several views, attention is first directed to FIG. 1, in which there is seen a simplified, vertical sectional view of a an integrated bi-directional transceiver package 100 incorporating a tilted bench assembly 105 supporting chip-level optical transceiver components, in accordance with the principle of the invention. The chip-level optical components carried by bench assembly 105 are considered part of bench assembly 105. Package 100 incorporates a header 106, which is the underlying support for bench assembly 105. Header 106 has an inner face or surface 109 and an opposing outer face or surface 113. Surfaces 109 and 113 reside in spaced-apart, substantially parallel planes. Header 106 is fashioned of steel that is coated with gold plating of a predetermined thickness, although it can be constructed of another metal or combination of metals and/or metal composites, or from a non-metallic material such as co-fired ceramic, or other material or combination of materials capable of providing support for placement of bench assembly 105 as described below. Bench assembly 105 is carried by header 106, and header 106 constitutes the underlying support for bench assembly 105. Header 106 supports leads 112, which extend therethrough between surface 109 and surface 113, as illustrated. Leads 112 are fashioned of conductive material, and provide electrical communication between the transceiver components of package 100 and external electrical components. Preferably, leads 112 are gold plated and are separated from header 106 by insulators, such as glass insulators. In a preferred embodiment, package 100 incorporates approximately eight leads. However, less or more can be used, if desired, including even one lead.

Header 106 supports a recess 110, which is formed therein through surface 109. In accordance with the invention, recess 100 defines a ramp 110A, which is oriented at an angle θ (FIG. 2) relative to surface 109. Bench assembly 105 is held by recess 110, and is disposed against ramp 110A so as to reside in a tilted state, thus aligning its chip-level optical transceiver components in a tilted state. Ramp 110A is thus formed to receive and hold bench assembly 105, which carries transceiver components operable for emitting a wavelength of light $\lambda_1$ along an optical path 220. Bench assembly 105 is described in more detail below in conjunction with FIG. 2.

In the preferred embodiment disclosed herein, package 100 includes a preamplifier 107 attached to surface 109, which is coupled in electrical communication to bench assembly 105 and lead 112. Preamplifier 107, which is an optical component, amplifies electrical signals from bench assembly 105. Preamplifier 107 can be omitted, if desired.

Package 100 incorporates an attached can structure 104, which overlies surface 109. Can structure 104 is attached to header 106, preferably to surface 109, and cooperates with header 106 to enclose bench assembly 105 and preamplifier 107. Can structure 104 provides hermetic sealing of bench assembly 105 and preamplifier 107. Can structure 104 defines opposing openings 114 and 115, in which opening 114 is located proximate surface 109, and opening 115 is formed opposite surface 109 and is adapted and arranged to receive therethrough an optical fiber 101.

Bench assembly 105 is disposed in recess 110 and against ramp 110A, as previously mentioned, and, in accordance with the invention, is optically aligned with, and thus optically coupled to, fiber 101. The tilt of bench assembly 105 as defined by angle θ, as defined by ramp 110A, is in a range from approximately 5° to 40° relative to surface 109 of header 106. In accordance with the invention, fiber 101 is thus optically aligned with bench assembly 105, in which the optical alignment is facilitated by the tilt of bench assembly 105 relative to fiber 101.

Optical fiber 101 extends into package 100, and is operative for transmitting a wavelength of light $\lambda_2$ from a remote light source or transmitter. Optical fiber 101 is held in place by package 100, so as to be disposed therein, and through opening 115 of can structure 104, with a flange 103, which is part of package 100. Flange 103 is externally attached to can 104 proximate opening 115, such as by way of a selected adhesive or welding or solder or the like, encircles fiber 101, and supports fiber 101, thus holding it in place. Overlying flange 103 is a ferrule assembly 102, which is also part of package 100. Fiber 101 passes through, and is secured by, ferrule assembly 102. Ferrule assembly 102, flange 103 and can structure 104 cooperate as a support structure for fiber 101, in which this defined support structure is attached to header 106. Flange 103 can be considered part of can structure 104, if desired. Because header 106 is attached to can structure 104, header 106 can be considered part of, or otherwise an extension of, can structure 104 and, therefore, part of or otherwise an extension of the support structure as defined herein.

Package 100 also incorporates an attached strain relief boot 108, which surrounds can structure 104, flange 103, and ferrule assembly 102, and also a portion of fiber 101 extending upwardly from ferrule assembly 102. Strain relief boot 108 provides added support to package 100, and inhibits package 100 from becoming fractured or otherwise damaged as a result of turns or thrust abuse. Strain relief boot 108 encloses can structure 104, flange 103, ferrule assembly 102, and the portion of fiber 101 extending into and through ferrule assembly 102 to within can structure 104.

Figure 2:
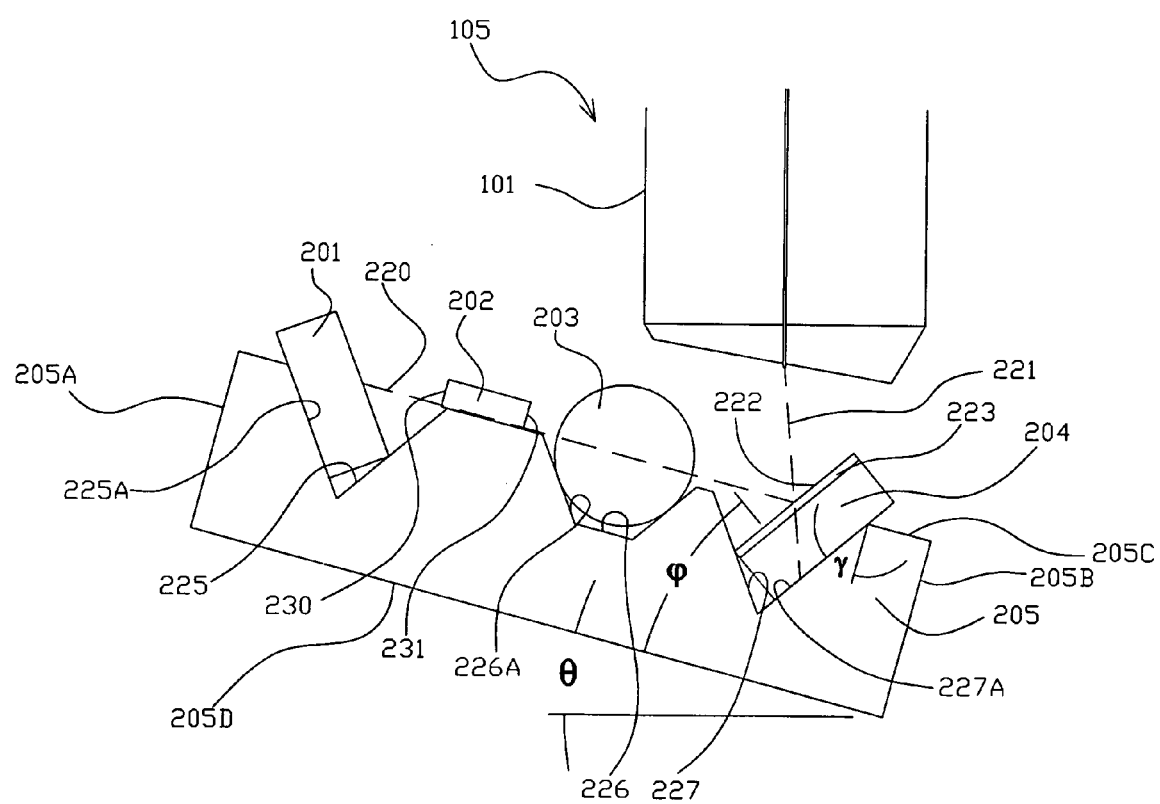
FIG. 2 is a simplified, vertical sectional view of the tilted bench assembly of FIG. 1 carried by a header and disposed in optical alignment with an optical fiber.

Looking to FIG. 2, bench assembly 105, which functions as a transceiver as previously mentioned, consists of a bench 205, which, in accordance with the principle of the invention, supports chip-level optical transceiver components, namely, two photodiodes 201 and 204, a light emitting device 202, and a lens 203. In a further and more particular aspect, the chip-level optical transceiver components of bench assembly 105 function as a chip-level optical transceiver. Bench 205 is elongate, is generally rectangular in shape, and, for the purpose of orientation in connection with the ensuing discussion, has opposing ends 205A and 205B, and opposing upper and lower surfaces 205C and 205D. Pockets or trenches 225, 226, and 227, which are disposed between ends 205A and 205B, and are formed into bench 205 through upper surface 205C. Trench 225 is V-shaped and is disposed adjacent end 205A. Trench 227 is also V-shaped, and is disposed adjacent end 205B. Trench 226 is generally V-shaped, and is disposed between trenches 225 and 226. Trenches 225, 226, and 227, are formed into bench 205, such as by way of etching (e.g., wet or dry etching), cutting, machining, etc. Bench 205 is integrally fashioned, and is constructed of silicon (Si), a low temperature co-fired ceramic, or a similar material or combination of materials that can be etched or otherwise cut to form trenches 225, 226, and 227. Photodiode 201 is carried by trench 225, lens 203 is carried by trench 226, photodiode 204 is carried by trench 227, and light emitting device 202 is attached to upper surface 205C between trenches 225 and 226, and between photodiode 201 and lens 203.

Light emitting device 202 is operable for emitting light at wavelength $\lambda_1$ along an optical path 220. Preferably, light emitting device 202 is an edge-emitting emitting semiconductor laser. However, light emitting device 202 can be a face-emitting semiconductor laser, or other desired form of laser-emitting device. Trenches 225, 226, and 227, are aligned on optical path 220.

Photodiode 201 is held in trench 225 and rests against a major surface 225A of trench 225, and is positioned or otherwise aligned so that it is able to detect light at wavelength $\lambda_1$ emitted through end 230 of device 202 along optical path 220. Photodiode 201 controls the output of light emitting device 202, and this arrangement is well known in the art. End 230 of device 202 is directed toward photodiode 201. Lens 203 is held in trench 226, and is positioned to direct, e.g., collimate, light at wavelength $\lambda_1$ emitted through end 231 of device 202 to photodiode 204. Lens 203 is preferably a ball lens, although those of ordinary skill will appreciate that other lens forms can be used. Photodiode 204 is held in trench 227 and rests against a major surface 227A thereof, and is positioned or otherwise aligned so that it is able to detect light at wavelength $\lambda_1$ from lens 203 along optical path 220. Photodiode 204 incorporates a dichroic filter 223, which, in the preferred embodiment disclosed herein, consists of an applied dichroic mirror, although it can consist of an applied thin film of dichroic material, if desired. Dichroic filter 223 defines an outer surface 222.

As previously mentioned, optical fiber 101 transmits a wavelength of light $\lambda_2$, from a light source or transmitter, along optical path 221. Bench assembly 105 and fiber 101 are optically aligned so as to provide a peak optical signal, in which optical path 220 is coincident relative to optical path 221. Light at wavelength $\lambda_1$ from lens 203 along optical path 220 is directed against dichroic filter 223 of photodiode 204, and is reflected therefrom into fiber 101 along optical path 221. Light at wavelength $\lambda_2$ from optical fiber 101 along optical path 221 is also directed toward dichroic filter 223 of photodiode 204, and passes there through to an active region of photodiode 204 and is converted into an electrical signal.

And so it is to be understood that dichroic filter 223, which is considered part of photodiode 204, is adapted and arranged to reflect wavelength of light $\lambda_1$ into fiber 101 along optical path 221, and to permit the wavelength of light $\lambda_2$ along optical path 221 to pass therethrough photodiode 204 to an active region thereof for conversion into an electrical signal. In one embodiment, $\lambda_1$ can be 1310 nm and $\lambda_2$ can be 1550 nm. In another embodiment, $\lambda_1$, can be 1550 nm and $\lambda_2$ can be 1310 nm. It will be understood that 1310 nm and 1550 nm are wavelengths typically used in optical fiber communication systems. However, it will be understood that other wavelengths could be used, and that the use of 1310 nm and 1550 nm in this disclosure is set forth as a matter of example and not by way of limitation.

Surface 222 is oriented at an angle $\phi$ relative to optical path 220 by tilting bench assembly 105 at a desired angle, namely, angle $\theta$ as provided by ramp 110A, or, in accordance with an alternate embodiment, by choosing an angle $\gamma$ of surface 227A of trench 227. Hence, light emitting device 202 and fiber 101 can be optically aligned by choosing at least one of angles $\theta$, $\phi$, and $\gamma$. In a preferred embodiment, optical paths 220 and 221 are optically aligned by disposing bench assembly 105 at a desired tilt or angle as defined by angle $\theta$, in accordance with the principle of the invention.

Thus, an integrated bi-directional optical transceiver is disclosed, which is capable of transmitting and receiving data in an optical fiber, which can be used in a network and in other ways, namely, as a phase converter in a computer, and in other like applications. A bi-directional optical transceiver constructed in accordance with the principle of the invention is easy to construct and inexpensive, and is capable of providing low cost and high power optical communication in a fiber to a network. Because the transceiver package disclosed herein incorporates a bench to which chip-level optical transceiver components are attached, a transceiver package constructed and arranged in accordance with the principle of the invention is highly compact, and very small, as compared to existing transceiver packages. The transceiver package disclosed herein allows bi-directional communication by using a dichroic filter positioned on a photodiode. The dichroic filter is chosen to allow the transmission of one wavelength of light while allowing the reflection of another wavelength of light.

The present invention is described above with reference to a preferred embodiment. Those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

What is claimed is:

1. Apparatus comprising:
   an optical fiber; and
   a chip-level optical transceiver carried by a bench disposed in a tilted state aligning the chip-level optical transceiver with the optical fiber, the chip-level optical transceiver comprising:
   a light emitting device, having an output, for emitting a first wavelength of light along a first optical path;
   a first photodiode for controlling the output of the light emitting device;
   a second photodiode having an active region;
   a lens for receiving the first wavelength of light along the first optical path from the light emitting device and collimating the first wavelength of light to the second photodiode along the first optical path; and
   the second photodiode for reflecting the first wavelength of light along the first optical path into the optical fiber along a second optical path.

2. Apparatus of claim 1, further comprising a package securing and containing the optical fiber, the bench, and the chip-level optical transceiver carried by the bench.

3. Apparatus of claim 2, wherein the package comprises:
   a support structure securing the fiber;
   a header coupled to the support structure; and
   the bench carried by the header in front of the optical fiber.

4. Apparatus of claim 3, wherein the package hermetically seals the bench and the chip-level optical transceiver carried thereby.

5. Apparatus of claim 4, further comprising:
the optical fiber for transmitting a second wavelength of light to the second photodiode along the second optical path; and
the second photodiode adapted and arranged to permit the second wavelength of light to pass therethrough to the active region thereof for conversion into an electrical signal.

6. Apparatus of claim 5, wherein the first wavelength of light is different from the second wavelength of light.

7. Apparatus comprising:
an optical fiber;
a header mounted adjacent the optical fiber; and
a chip-level optical transceiver supported by a bench carried by the header in a tilted state aligning the chip-level optical transceiver components with the optical fiber, the chip-level optical transceiver comprising:
a light emitting device, having an output, for emitting a first wavelength of light along a first optical path;
a first photodiode for controlling the output of the light emitting device;
a second photodiode having an active region;
a lens for receiving the first wavelength of light along the first optical path from the light emitting device and collimating the first wavelength of light to the second photodiode along the first optical path; and
the second photodiode for reflecting the first wavelength of light along the first optical path into the optical fiber along a second optical path.

8. Apparatus of claim 7, further comprising:
a support structure securing the fiber; and
the header coupled to the support structure.

9. Apparatus of claim 8, wherein the support structure and the header cooperate to hermetically seal the bench and the chip-level optical transceiver carried thereby.

10. Apparatus of claim 9, further comprising:
the optical fiber for transmitting a second wavelength of light to the second photodiode along the second optical path; and
the second photodiode adapted and arranged to permit the second wavelength of light to pass therethrough to the active region thereof for conversion into an electrical signal.

11. Apparatus of claim 10, wherein the first wavelength of light is different from the second wavelength of light.

12. Apparatus of claim 10, wherein the first optical path is coincident to the second optical path.

13. Apparatus comprising:
a package including a header;
an optical fiber extending into the package, and secured thereby adjacent the header; and
a chip-level optical transceiver supported by a bench carried by the header in a tilted state aligning the chip-level optical transceiver components with the optical fiber, the chip-level optical transceiver comprising:
a light emitting device, having an output, for emitting a first wavelength of light along a first optical path;
a first photodiode for controlling the output of the light emitting device;
a second photodiode having an active region;
a lens for receiving the first wavelength of light along the first optical path from the light emitting device and collimating the first wavelength of light to the second photodiode along the first optical path; and
the second photodiode for reflecting the first wavelength of light along the first optical path into the optical fiber along second optical path.

14. Apparatus of claim 13, wherein the package hermetically seals the bench and the chip-level optical transceiver carried thereby.

15. Apparatus of claim 14, further comprising:
the optical fiber for transmitting a second wavelength of light to the second photodiode along the second optical path; and
the second photodiode adapted and arranged to permit the second wavelength of light to pass therethrough to the active region thereof for conversion into an electrical signal.

16. Apparatus of claim 15, wherein the first wavelength of light is different from the second wavelength of light.

17. Apparatus of claim 15, wherein the first optical path is coincident to the second optical path.

* * * * *